Patented Sept. 19, 1939

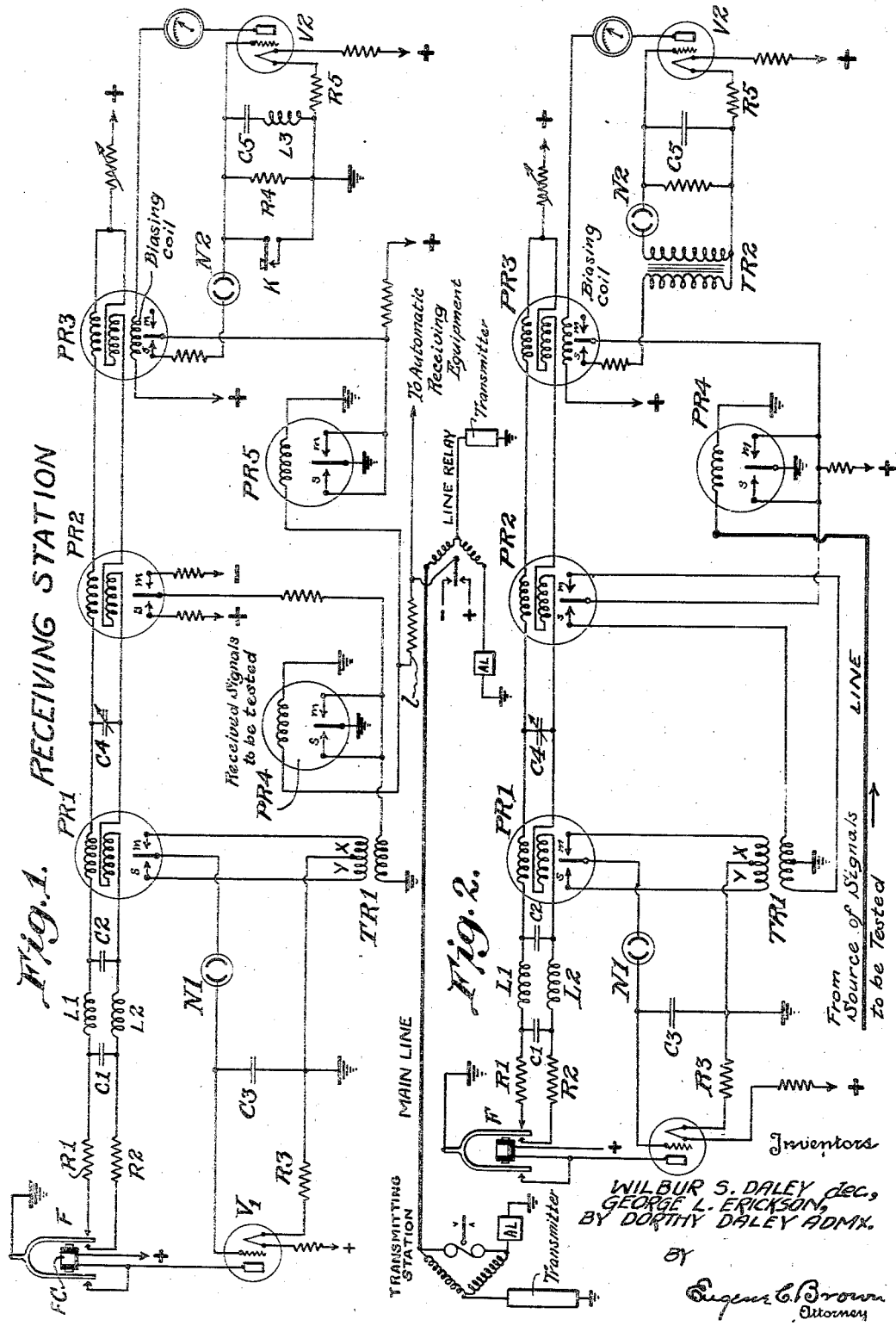

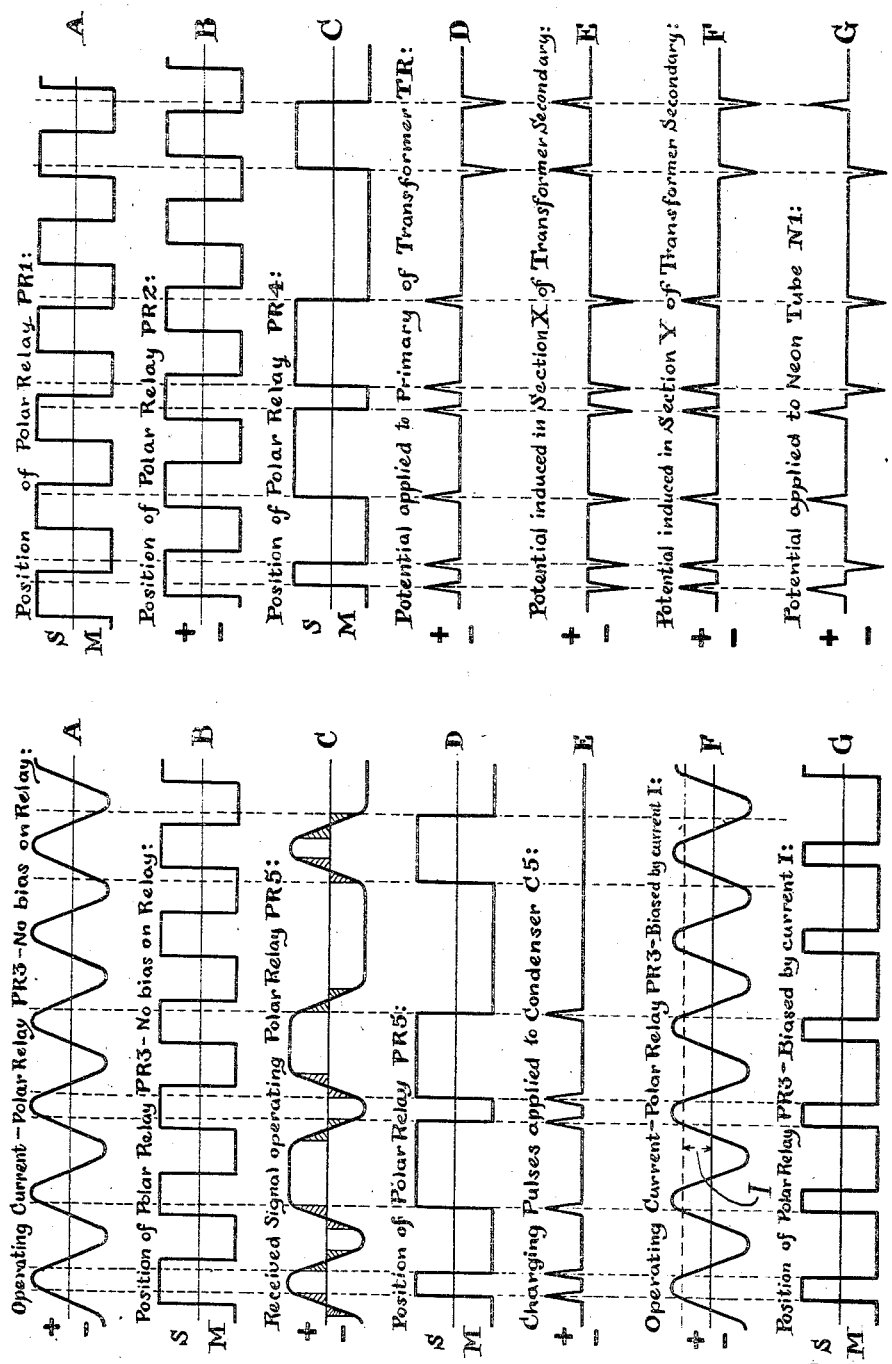

2,173,534

UNITED STATES PATENT OFFICE 2,173,534

AUTOMATIC RECORDING MARGIN INDICATOR

George L. Erickson, Hasbrouck Heights, N. J., and Wilbur S. Daley, deceased, late of Burlington, Vt., by Dorothy Daley, administratrix, Burlington, Vt., assignors to The Western Union Telegraph Company, New York, N. Y., a corporation of New York Application November 19, 1935, Serial No. 50,612

4 Claims. (Cl. 178—69)

This invention relates to the detection of distortion in signaling circuits and especially to the measurement of the distortion of telegraph signals incident to the transmission during the normal operation thereof.

Telegraph signals are each made up of a plurality of impulses, each impulse having a definite length. Distortion of the impulses and therefore of the signals may be produced by various causes inherent in the line or in the apparatus connected therewith or both. The distortion with which this invention is concerned manifests itself in lengthening or shortening the impulses and this interferes with the proper recording of the signals and consequently impairs the efficiency of transmission.

The quality or operating margin of multiplex telegraph systems is usually determined by measuring the orientation margins or printing "range," an arbitrary means of designating the number of degrees through which the receiving segments of the multiplex distributor may be rotated without causing false signals to be printed. Heretofore, it has been a standard practice to transmit a test signal, such as a certain combination of letters or words, and to measure the "range" before the actual transmission of traffic signals is started. This method, although accurate at the time, does not take into account any change in the range due to later changes in line characteristics, increased interference, or other variations which may either increase or decrease the range.

The object of this invention is to provide an automatic recording margin indicator which allows accurate determination of the operating margin or range of a multiplex or similar telegraph system without interfering with the normal functions of traffic signals whose range is being determined. This indication may be obtained by either a deflecting or a recording type instrument and operates continuously, or in other words, it will immediately record any change in range regardless of the cause of this change.

The invention will be more fully understood by reference to the accompanying drawings in which—

Figure 1 is schematic diagram illustrating one arrangement embodying the invention;

Figure 2 is a modification of the arrangement shown in Figure 1;

Figures 3 and 4 are oscillographic representations of the applied potentials and the current impulses occurring in or operating the several parts of the arrangement shown in Figs. 1 and 2.

Referring to Fig. 1, the signals sent over the line are received on the usual multiplex receiving set or automatic printing equipment. For test purposes said signals are also applied through a high resistance leak circuit $l$ to the polar relays PR4 and PR5, the operating margin of which is to be measured. Polar relays PR1, PR2 and PR3 are driven by the fork F. Condenser C4 may be so adjusted that relays PR2 and PR3 operate at 90° (in time phase displacement) behind relay PR1. The resistances R1, R2 and inductances L1, L2 and condensers C1, C2 constitute a shaping network to shape the impulses, produced by the vibration of the fork F, to an approximate sine wave form.

Considering first the arrangement for maintaining the fork in exact synchronism with the received signals. Incoming signals actuate the main line relay and the latter causes the operation of relays PR4 and PR5. Relay PR2 controls the polarity of the potential which is applied to the primary winding of transformer TR1. Relay PR1 controls the polarity of the secondary induced voltage which is applied to condenser C3 through the neon lamp N1. Condenser C3 receives an incremental charge for each operation of relay PR4, that is to say, for each line signal reversal. It will be evident that an impulse can be delivered to the transformer TR1 only when the tongue of relay PR4 is in transit from one contact to the other. The charge accumulated by this condenser, together with the IR drop across resistance R3 serves to regulate the potential of the grid of vacuum tube V1 with respect to the filament, thereby controlling the current in the plate circuit of the tube, which includes the driving coil FC of the fork.

The polarity of the incremental charge delivered to condenser C3 will depend upon the relative positions of the armatures of relays PR1 and PR2. When the armatures of relays PR1 and fork are on like contacts, i. e., both on spacing or both on marking, the incremental charge is such as to make the currents of vacuum tube V1 more positive with respect to the filament. Conversely when the armatures of relays PR1 and PR2 are on unlike contacts, the incremental charge is such as to make the grids more negative with respect to the filament.

It will be noted that the polarity of condenser C3 will become increasingly positive or increasingly negative, depending upon whether more line signal reversals occur when the armatures of relay PR1 and PR2 are on like contacts than occur when the armatures are on unlike contacts. This condition will depend upon the phase position of the incoming signal reversals with respect to the fork reversals. The period of the fork is the same as the line frequency of the signals. It will be evident from the above that the operation of relays PR1, PR2 and PR3 are maintained in exact synchronism with the incoming signals.

Now assuming that the plate current I of the vacuum tube V2 is zero under the influence of a negative grid bias, caused by the IR drop across resistance R5, the polar relay PR3 will be operated by the fork reversals in exact synchronism with the received signals. If, however, the received signal is so delayed or advanced as to cause the tongue of polar relay PR5 to leave either contact during the time the tongue of relay PR3 is on its spacing contact, a heavy positive potential will be applied to the neon or similar tube 2 which will break down and allow the condenser C5 to become charged. The grid of tube V2, now becoming more positive will cause a current I to flow in the plate circuit of the vacuum tube, thus applying a slight marking bias to the relay PR3. This marking bias will continue to increase, due to successive positive pulses building up a charge on condenser C5, thus shortening the period of rest on the spacing contact to the point where no reversals of relay PR5 occur when the armature of relay PR3 is on its spacing contact and the circuit through the neon tube is again effectively opened. When this condition is reached no further charging pulses will be applied to the condenser C5.

The magnitude of the biasing current I will be proportional to the length of the useful received signal and hence can serve as an indication of the operating margin.

Additional refinements may also be added such as resistance R4 and short circuiting switch K. The resistance R4 allows the charge which has been accumulated by condenser C5 to slowly decrease, thereby slowly decreasing the current I until a further charging pulse results. In this manner the current I will follow quite accurately any variation in the printing range. If desired key K may be closed to completely discharge the condenser C5 before again causing a recurrence of operation.

A radio frequency choke L3 prevents any stray radio frequencies, generated by sparking at the relay contacts or by nearby apparatus, from building up a charge on condenser C5 and thereby giving a false indication. It is evident that various current limiting resistances may be used to control the operation of the apparatus.

The circuit of Figure 2 differs slightly from that of Figure 1, but the theory of operation remains unchanged. In this figure only one relay is operated by the received signal, serving simultaneously the synchronizing and measuring functions of the apparatus. It will be noted that the arrangement of Figure 2 requires a transformer TR1 having both primary and secondary coils provided with center taps. Other differences include the insertion of a transformer TR2 between the spacing contact of relay PR3 and the neon tube N2, and the omission of key K and radio frequency choke L3.

A further understanding of the operation of the system may be obtained by referring to the oscillograms of Figures 3 and 4. In Figure 3, A is an oscillogram representing the pulses which control the operation of polar relay PR3. These pulses, produced by the vibration of fork F, have been shaped to an approximate sine wave by the network of resistances R1 and R2, condensers C1 and C2 and inductances L1 and L2. The position of the tongue of relay PR3 when there is no biasing current is illustrated diagrammatically by B.

C is an oscillogram of an assumed received signal, no distortion being present. In actual practice, however, this received signal will be distorted, due to various causes such as bias and interference, and may cause the relay PR5 to operate at any time during the shaded portion of the signal. Oscillogram D is illustrative of the signals which may be repeated from the tongue of relay PR5. It will be noticed from oscillogram E that an incremental pulse is applied to condenser C5 whenever a reversal in position of relay PR5 (as illustrated in D) occurs with relay PR3 on its spacing contact (as illustrated in B). These incremental pulses charge the condenser C5 causing the grid of tube V2 to become more and more positive thereby increasing the plate current I which flows in the biasing coil of relay PR3 until eventually the current is large enough to prevent this relay from being in its spacing position during the reversal of relay PR5. This condition is illustrated at F and G, in which F shows the oscillogram of the current operating relay PR3, biased by the current I and indicating that only the small fraction of the current wave above the dotted line is effective to operate the relay, and G oscillogram shows the position of the tongue of the relay PR3 when thus biased, indicating that the tongue is only on the spacing side only a fraction of the time that it is on the biased marking side.

It is apparent from the above analysis that the magnitude of this biasing current is a measure of the relative lengthening or shortening of the telegraph signals as reproduced by the receiving relay.

Figure 4 has been included to illustrate that a received signal, which causes relay PR5 to operate as shown in D of Fig. 3, will not cause the test set to lose synchronism with the transmitter. In Fig. 4, A, B and C illustrate diagrammatically the positions of relays PR1, PR2, and PR4 respectively. The time lag, or phase displacement between relays PR1 and PR2 may be adjusted by means of condenser C4. With this arrangement the pulses applied to the primary of transformer TR1 occur as shown in D, and these in turn induce potentials in the two halves of the secondary of the transformer as shown in E and F. This follows from the fact, as above explained, that the relays PR1 and PR2 are displaced 90° in phase and that the polarity of the currents transmitted to the transformer TR1 is controlled by the position of the armature of relay PR2 while the direction of the currents flowing alternately in the two halves of the transformer is controlled by the position of the armature of relay PR1 from which follows that when both armatures are on the spacing side or both on the marking side, the incremental charge transmitted to the condenser C3 will be positive and conversely when said armatures are on unlike contacts the incremental is such as to make the condenser more negative. The plate current of the tube V1 which flows through the fork coil FC is, of course, controlled by the charge on the condenser. So long as there is no variation in the speed of signal transmission, distortion of the impulses due to various causes, merely cause the incremental charges on the condenser to alternate in a random fashion, as indicated at G in Fig. 4 and hence their resultant effect upon the fork coil does not produce any practical change upon the speed of the fork which has been adjusted to vibrate at the normal speed of signal transmission. If there should be an actual change in the speed of transmission of the signals, there would, of course, be a resultant effect which would either increase or retard the normal speed of the fork.

This reasoning applies to all types of distortion involving only a disproportion between the relative lengths of marking and spacing signals. In the case of an actual change in speed of the signals, the fork will of course adjust itself to that speed.

It is apparent that either an indicating or a recording monitoring instrument may be used to give the magnitude of the biasing current I. A ballistic galvanometer may also be used. If desired, this could readily be calibrated to read directly in points of printing range, percent perfect signal or in other desired manner.

We have illustrated and described preferred arrangements embodying our method of measuring the distortion of the signal impulses in telegraph systems but it is to be understood that the invention is capable of embodiment in other forms and circuit arrangements without departing from the scope of the appended claims.

We claim:

1. The method of measuring the distortion present in received traffic signals under usual operating conditions, which consists in operating a relay in accordance with the non-uniform received signal, producing uniform signals in synchronism with the received signals, operating a second relay in accordance with the uniform signals, and continuously cumulatively measuring differences in time between the operations of the first relay and a corresponding operation of the second relay, said difference in time representing the percentages of distortion present in the received signals.

2. The method of measuring the distortion present in the received signals of a telegraph system under normal operating conditions, which consists in locally producing uniform signals of substantially sine wave form in synchronism with the received signals, electrically combining the effects of the locally produced signals and the received signals and causing the resultant effect to automatically produce a continuous registration corresponding to the average percentages of the distortion present in the received signals.

3. A system for measuring the distortion of the received signals of a telegraph system under normal operating conditions, comprising means for locally generating uniform signals of substantially sine wave form in synchronism with the received signals, means controlled by said received signals for maintaining synchronism between said uniform signals and said received signals, means under the combined control of said received signals and said locally generated signals for producing an effect proportional to time or phase differences between said signals and an instrument responsive to said resultant effect, operating automatically to continuously register the amount of said differences which thereby represent the percentages of distortion present in the received signals.

4. A system for measuring the distortion of the received signals of a telegraph system under normal operating conditions, comprising a relay responsive to the received signals, means for locally generating uniform signals of substantially sine wave form in synchronism with the received signals, a second relay responsive to said generated signals, means for electrically superposing upon said second relay a biasing current proportional to the difference between the times of operation of said relays and an indicating instrument responsive to said biasing current.

GEORGE L. ERICKSON.
DOROTHY DALEY,
*Administratrix of the Estate of Wilbur S. Daley, Deceased.*